United States Patent [19]

Gotanda

[11] Patent Number: 4,787,223
[45] Date of Patent: Nov. 29, 1988

[54] DOOR LOCK DEVICE FOR AUTOMOBILE

[75] Inventor: Motohiro Gotanda, Abiko, Japan

[73] Assignee: Doei Kikau Center Co., Ltd., Tokyo, Japan

[21] Appl. No.: 942,344

[22] Filed: Dec. 16, 1986

[30] Foreign Application Priority Data

Dec. 18, 1985 [JP] Japan .................................. 60-283059

[51] Int. Cl.⁴ .............................................. E05B 65/20
[52] U.S. Cl. ...................................... 70/264; 292/216
[58] Field of Search .................... 70/264, 263, 262; 292/216, 207, DIG. 23, DIG. 25

[56] References Cited

U.S. PATENT DOCUMENTS

| 1,544,960 | 7/1925 | Watts | 292/216 |
| 4,342,209 | 8/1982 | Kleefeldt | 70/264 |
| 4,452,058 | 6/1984 | Noel | 70/264 |
| 4,586,737 | 5/1986 | Arlauskas | 292/207 |
| 4,667,990 | 5/1987 | Quantz | 292/216 |

Primary Examiner—Robert L. Wolfe
Attorney, Agent, or Firm—Stephen F. K. Yee

[57] ABSTRACT

A door lock device for automobile, including a manual lock member provided inside of the door for locking and unlocking the door, and a key or laser key for unlocking the door, is so arranged that the engine is made operable only when the door is unlocked with the key or the laser key.

4 Claims, 15 Drawing Sheets

FIG. 12
FIG. 13
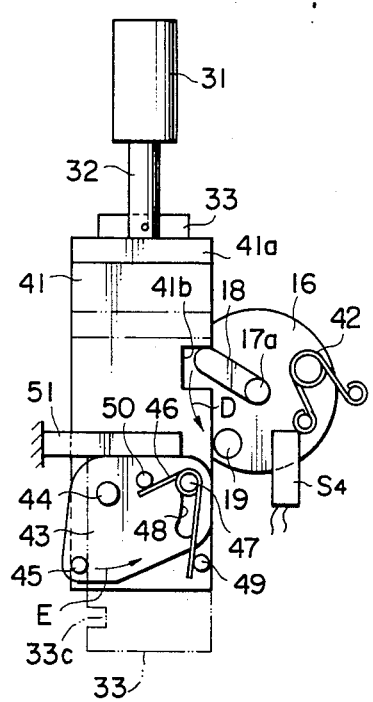
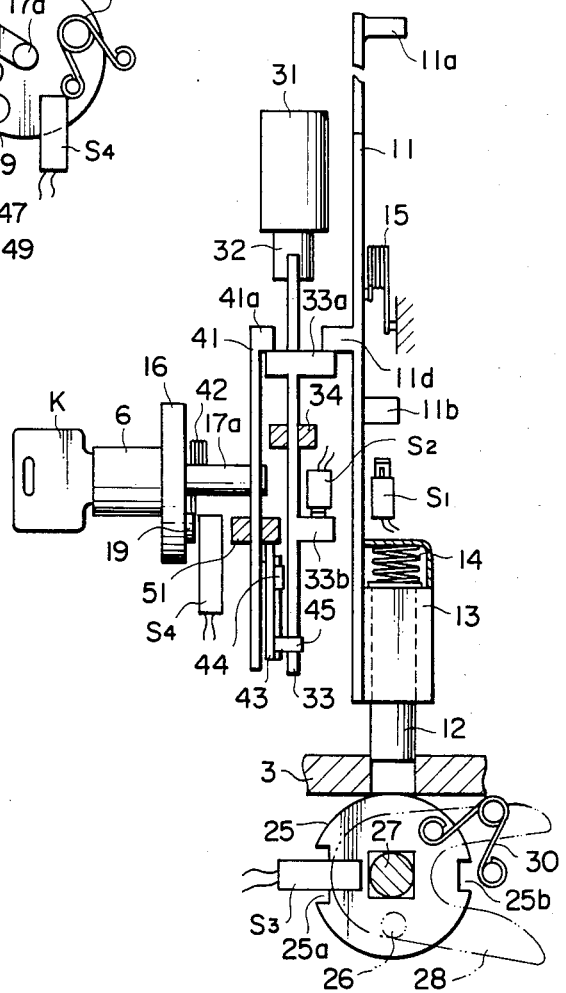

DOOR LOCK DEVICE FOR AUTOMOBILE

This invention relates to a door lock device for automobile.

Door lock device for automobiles generally includes a cylinder lock adapted for locking and unlocking the door from outside thereof by a key which also serves as engine key, and a manual lock operated from inside of the door for locking and unlocking the door.

Car burglars usually pull up the manual lock using a wire or a thin plate for unlocking the door of the car and, thereafter, start the engine by directly connecting the ignitor, starter motor and the like with the battery.

The present invention contemplates the provision of a door lock device which permits the start of the engine only when the door is unlocked with the use of a key. As a consequence, it is no longer necessary for the door key to function also as an engine key for starting the engine, i.e. providing an engine start switch on the front panel is sufficient.

In accordance with the present invention there is provided a door lock device for automobile having an engine starting circuit, a door frame and a door swingeably supported to the door frame, said device comprising:

an operating plate supported in the door and moveable between upper and lower positions;

engaging means engageable with said operating plate and moveable between first and second positions such that when said engaging means is displaced from the first to second position the operating plate is moved from the lower to upper position, but when the operating plate is moved from the lower to upper position the engaging means in the first position is disengaged therefrom and is not moved;

actuating means for moving said engaging means from the first to second position;

a hook member provided in the door frame;

latch means provided in the door and capable of engaging with said hook member when the door is closed and of disengaging from said hook member when the door is opened;

an engaging portion provided in said operating plate and engageable with said latch means to prevent said latch means from disengaging from said strike when said operating plate is in the lower position and disengageable from said latch means to permit said latch means to disengage from said strike when said operating plate is in the upper position;

means capable of detecting the position of said engaging means and electrically coupled to said engine starting circuit to make said engine starting circuit operable only upon detection of the movement of said engaging means from said first to second position.

The present invention will now be described in detail below with reference to the accompanying drawings, in which:

FIG. 12 is another side view of FIG. 9;

FIGS. 13 and 14 are views similar to FIGS. 9 and 10, respectively, showing the state of the lock device in which the door is unlocked and opened;

Figure 1:
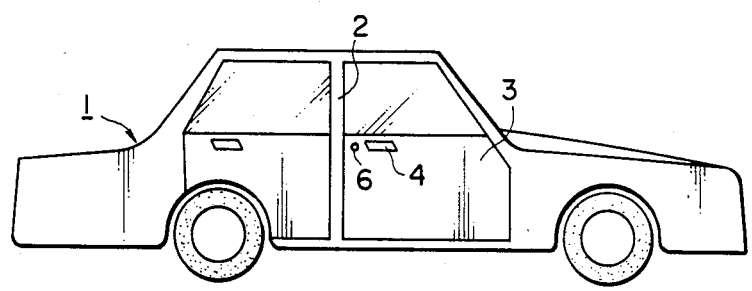
FIG. 1 is an elevational view diagrammatically showing an automobile which is provided with a door lock device according to the present invention.
Figure 2:
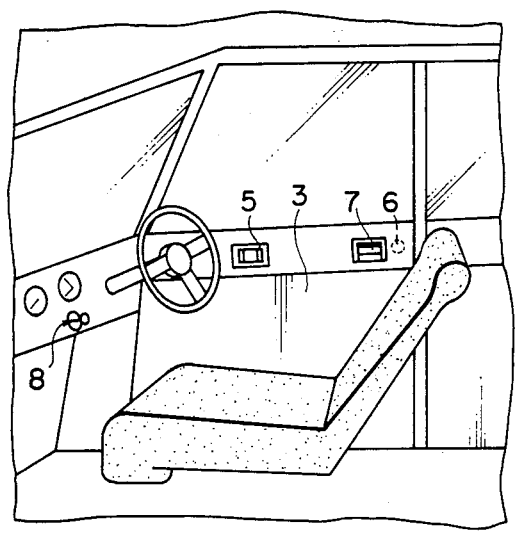
FIG. 2 is a partial, perspective view diagrammatically showing the interior of the car of FIG. 1.

Referring first to FIGS. 1 and 2, designated generally as 1 is an automobile having a body 2 and a door 3 swingably secured to the body 2 and provided with a door handle 4 and a cylinder lock 6. As shown in FIG. 2, there are provided, in the interior of the automobile 1, an inner door handle 5 operated for opening and closing the door 1 and a manual lock 7 for locking and unlocking the door 3. The reference numeral 8 designates an engine switch for starting and stopping the engine. The engine switch 8 in this embodiment is operable as such without using an engine key. However, if desired, the engine switch may be arranged so that it is actuated in the conventional manner by a key used for opening the cylinder lock 6. The door 3 accomodates the main structure of door locking device according to the present invention.

Figure 3:
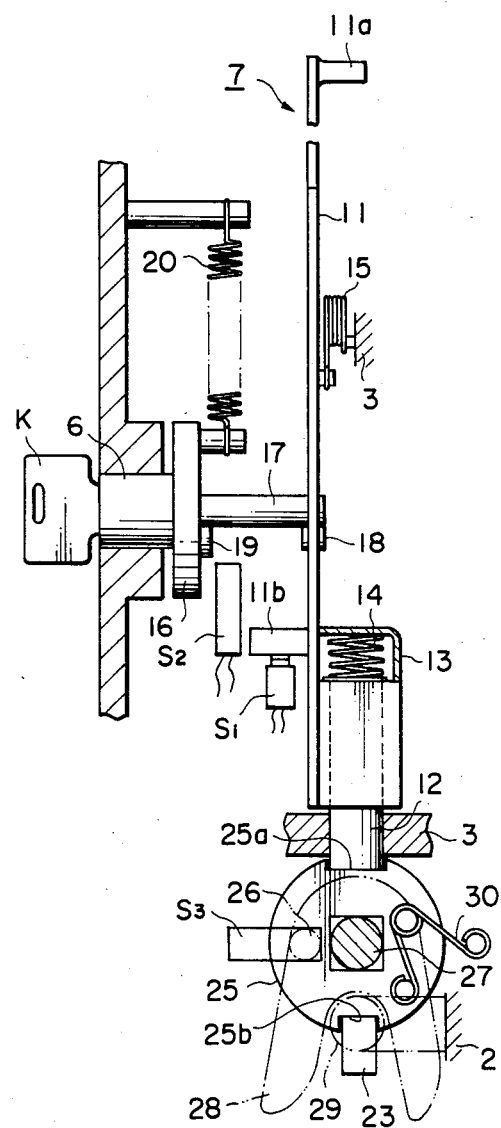
FIG. 3 is an elevational view, partially in cross section, diagrammatically the main structure of one embodiment of the door lock device according to the present invention.
Figure 4:
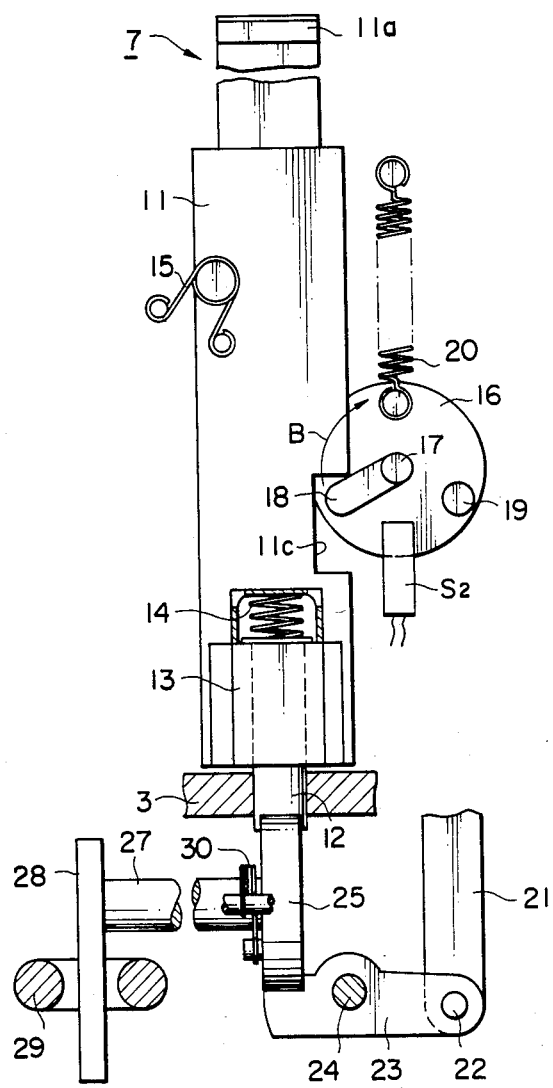
FIG. 4 is a side view of the structure of FIG. 3.

FIGS. 3 and 4 depict one preferred embodiment of the door lock device of this invention. The lock device, generally designated as 7, includes an operating plate 11 generally vertically slidably supported in the door 3. The operating plate 11 extends upward out of the door 3 and is provided at its top end with a lug 11a arranged to make easy the downward and upward movement, by hands, of the operating plate 11 between upper and lower positions. Designated as 15 is a coil spring one end of which is secured to the operating plate 11 with the other end being fixed to the door 3 so that the operating plate 11 may be maintained in either the upper position or the lower position by the action of the coil spring 15.

The operating plate 11 has a protruded portion 11b adapted for engaging with a switch $S_1$ fixed to the door 3 so that the switch $S_1$ is maintained in the ON and OFF positions when the operating plate 11 is in the lower and upper positions, respectively.

The operating plate 11 may also be upwardly moved by rotation of the key K inserted in the cylinder lock 6. Thus, the cylinder lock 6 is connected to a rotating plate 16 so that the rotating plate 16 may be rotated with the key K. The rotating plate 16 has a center shaft 17 about which the plate 16 is rotated and to which a lever 18 is fixedly secured. The lever 18 is engageable with an indented portion 11c of the operating plate 11 so that the rotation of the lever 18 in one direction (in the direction shown by the arrow B in FIG. 4) causes the operating plate 11 to move upward. The indented portion 11c of the operating plate 11 has a length sufficient enough to allow the lever 18 to disengage therefrom when the lever 18 is rotated in the other direction (counter clockwise in FIG. 4). Stated otherwise, when the operating plate 11 is displaced upward in the state shown in FIG. 4, the lever 18 is disengaged from the indented portion 11c and does not rotate. Designated as 20 is a spring for normally retaining the position of the rotating plate 16 in the state shown in FIGS. 3 and 4.

A switch $S_2$ is secured at a position adjacent to the rotating plate 16. The plate 16 is furnished with a magnet 19 so that the switch $S_2$ is turned ON when the magnet 19 is located at a position adjacent thereto.

In the lower portion of the operating plate 11, there is mounted a case 13 within which an engaging bar 12 is accomodated. The lower end of the engaging bar 12 is protruded from the lower open-ended portion of the case 13 and is shaped so as to engage with a first groove 25a provided in the periphery of a rotating member 25. The upper end of the engaging bar 12 is connected to a lower end of a spring 14 whose upper end is fixed to the ceiling of the case 13. Thus, the engaging bar 12 can be in pressure contact with the outer periphery (inclusive of the first groove 25a) of the rotating member 25 when the operating plate 11 is an the lower position. When the operating plate 11 is in the upper position, the engaging bar 12 is disengaged from the first groove 25a of the rotating member 25 to permit the rotation thereof.

The rotating member 25 is also provided with a second groove 25b with which one end portion of a rocking lever 23 is engageable. The rocking lever 23 is rotatably secured about a shaft 24. The other end of the rocking lever 23 is rotatably linked with an operating rod of the door handles (FIG. 1) by means of a hinge 22 so that the rocking lever 23 is rotated about the shaft 24 and engageable with and disengaged from the second groove 25b of the rotating member 25 in response to the operation of the outer and inner door handles 4 and 5. The rocking lever 23 is normally biased in the clockwise direction as seen in FIG. 4 by any suitable means.

Figure 5:
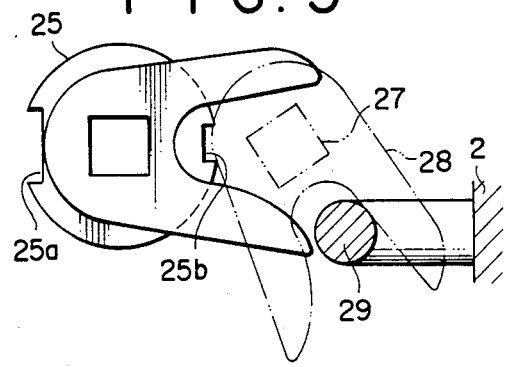
FIG. 5 is an explanatory view showing the engaging and disengaging movement of a latch relative to a hook member.

The rotating member 25 is rotatably supported to the door 3 by any suitable means (not shown) and is rotated about its axis 27 in response to the swing of the door 3 in a manner known per se. That is, a U-shaped engaging plate or latch 28 is secured to the axis 27 at a position opposite to the rotating member 25 for rotation therewith. The inner curved portion of the U-shaped engaging plate is so shaped as to engage with a hook member or strike 29 fixed to the car body frame 2 and to cause the engaging plate 28 to rotate when the door is opened or closed. Thus, one of the legs of the U-shaped engaging plate 28 is capable of being inserted into the hook member 99. As best seen from FIG. 5, as the door 3 is opened, the engaging plate 28 is rotated because of the engagement between the hook member 29 and the leg of the engaging plate 28 as shown in the phantom line. Upon further swing of the door 3, the engaging plate 28 is disengaged from the hook 29 and is oriented in the sideways position as shown in the solid line in FIG. 5. On the other hand, when the door 3 is closed, the engaging plate 28 is brought into engagement with and is guided by the hook 29 and, thus, is rotated about the axis 27. Designated as 30 is a coil spring to maintain the engaging plate 28 either in the vertical position as shown by phantom line in FIG. 3 or in the sideways position as shown in the solid line in FIG. 5. A magnet 26 is mounted on the rotating member 25 and is capable of actuating a switch $S_3$ ON and OFF.

The above-described door lock device operates as follows. In the state shown in FIGS. 3 and 4 in which the door 3 is closed and locked, when the key K is inserted into the cylinder lock 6 and rotated, the lever 18 is rotated in the direction shown by the arrow B in FIG. 4 against the compressive force of the spring 20. Thus, the operating plate 11, which is in engagement with the lever 18 at the indented portion 11c, is displaced from the lower position to the upper position and maintained at that position by the action of the coil spring 15 as shown in FIGS. 6 and 7.

In this moment, the switches $S_1$ and $S_2$ are turned OFF and ON, respectively. The turning of the switch $S_2$ to ON position causes the power source circuit of the engine starting circuit (not shown) to be closed, so that the engine is ready for starting upon turning the engine switch 8 (FIG. 2) ON. When the key K gripped is released, the lever is rotated by the action of the spring 20 to the original position together with the key K as shown by the phantom line in FIG. 7, making the switch $S_2$ OFF. However, since the size of the indented portion 11c of the operating plate 11 is large enough, the lever 18 is disengaged therefrom so that the operating plate 11 is maintained in the upper position by the action of the spring 15. Since the switch $S_2$ is connected to a relay of a self-holding circuit (not shown), the power source circuit for the engine starting circuit is maintained in a closed state even when the switch $S_2$ is turned OFF.

Figure 6:
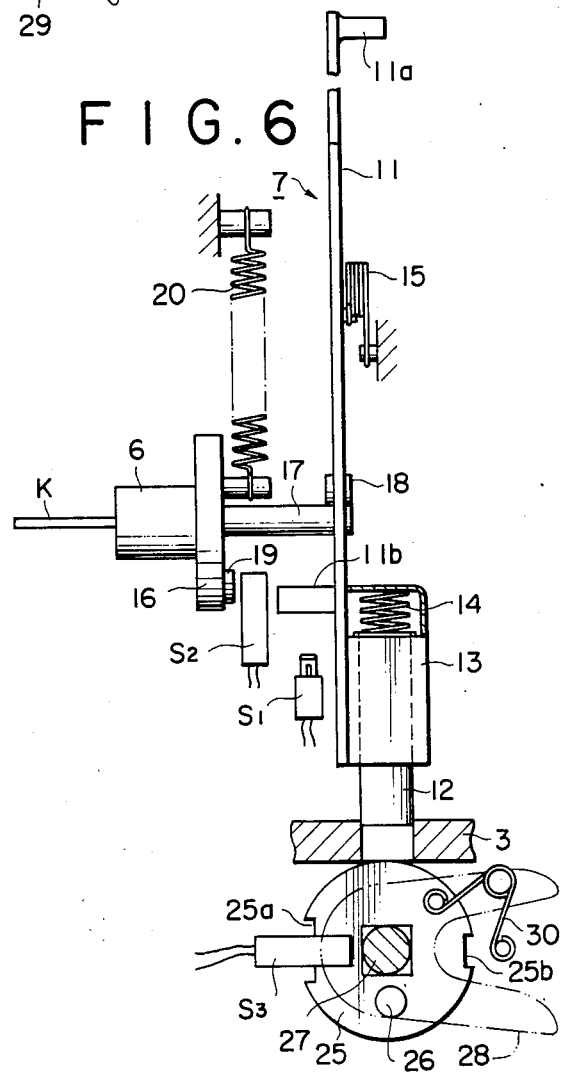
FIG. 6 is a view corresponding to FIG. 3 and showing the state of the structure when the door is in an open state.
Figure 7:
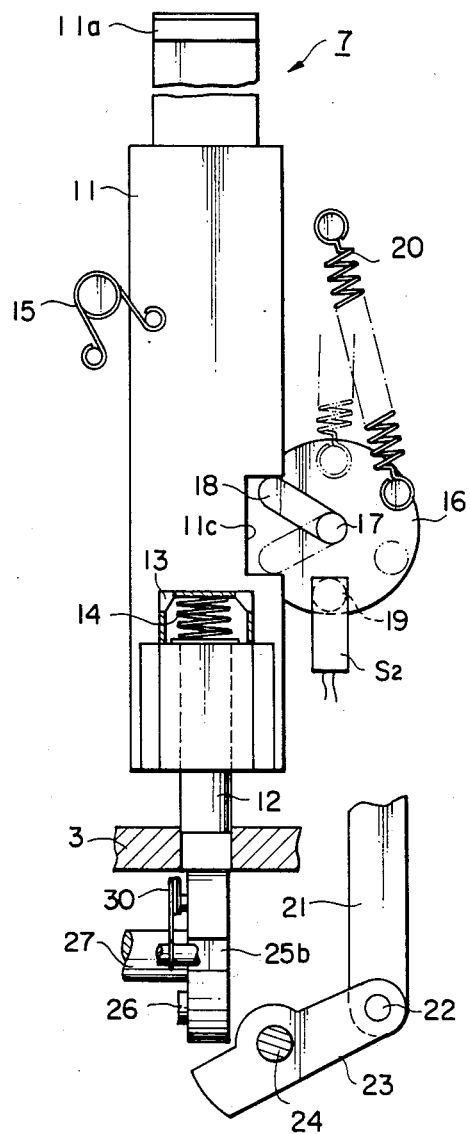
FIG. 7 is a side view of FIG. 6.

When the operating plate 11 is displaced to the upper position, the engaging bar 12 is also moved upward and is disengaged from the first groove 25a of the rotating member 25 as shown in FIGS. 6 and 7. In this state, when the door handle 4 is pulled to disengage the rocking lever 23 from the second groove 25b, the rotating member 25 which is released from the engagement by the engaging bar 12 and the rocking lever 23 is rendered rotatable, i.e. the door 3 is able to be opened. By opening the door 3, the U-shaped engaging plate 28 engaged by the hook member 29 is rotated to the sideways position as shown by the phantom line in FIG. 6. The switch S3 is turned OFF.

When the driver gets in the car and closes the door 3, the U-shaped engaging plate 28 is rotated upon contact with the hook member 29 to the vertical position as shown by the phantom line in FIG. 3. The rocking lever 23 which is in pressure contact with the periphery of the rotating member 25 is then engaged with the second groove 25b. When the lug 11a of the operating plate 11 is manually pushed down, the engaging rod 12 is engaged with the first groove 25a of the rotating member 25, so that the door lock device is returned in the state as shown in FIGS. 3 and 4.

In the case of getting out of the car, the lug 11a is pulled up. This causes the disengagement of the engaging bar 12 from the first groove 25a of the rotating member 25. By handling the inner door handle 5, the lever 23 is disengaged from the second groove 25b to permit the rotation of the rotating member 25. The door is then opened and the driver gets out of the car. In this case, the door lock device is in the state as shown in FIGS. 6 and 7 (The rotating plate 16 is in the state shown by the phantom line in FIG. 7).

In locking the door 3, the lug 11a is pushed down before closing the door 3. Thus, the switch $S_1$ is turned ON while the switch $S_2$ is remained in the OFF position. The engaging bar 12 is pushed downward and is brought into pressure contact with the periphery of the rotating member 25 by the returning force of the spring 14. When the door 3 is closed, the rotating member 25 is rotated because of the engagement of the U-shaped engaging plate 28 and the hook member 29, so that the engaging bar 12 is come into engagement with the first groove 25a due to the action of the spring 14. The switch $S_3$ is turned ON. The rocking lever 23 also comes into engagement with the second groove 25b. Thus, the door is reinstated in the locked state as shown in FIGS. 3 and 4. That is, unless the operating plate 11 is moved upward, the door 3 cannot be opened because the U-shaped engaging plate 28 is maintained in engagement with the hook 29. Moreover, even if someone can move the operating plate 11 without using the key K and can open the door 3, turning of the engine switch 8 cannot start the engine because the switch $S_2$ is maintained in the OFF position and the power source circuit for the engine starting circuit remains in the open state. Thus, it is not necessary that the engine switch 8 (FIG. 2) be of a type which is actuated with the use of the door key K.

Figure 8:
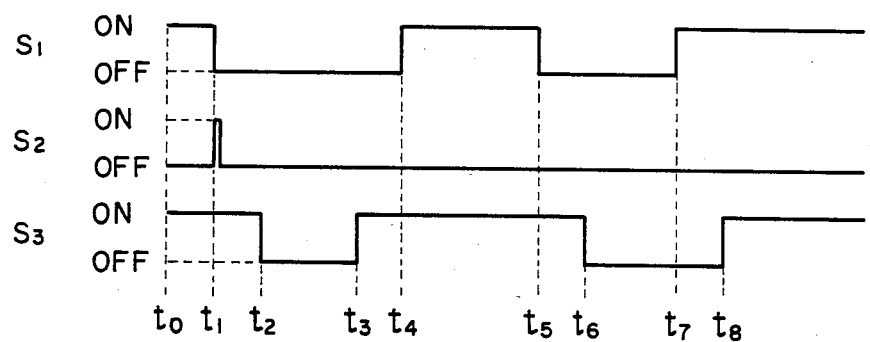
FIG. 8 is a wave form showing the state of switches.

The provision of the switches $S_1$ to $S_3$ makes it possible to detect various conditions of the door and door lock and, if desired, to actuate an alarm, for example, in an instance where the door is closed without being locked. This is the case when the switch $S_1$ is in the OFF position and the switch $S_3$ is in the ON position. FIG. 8 illustrates wave forms showing the action of the switches $S_1$ to $S_3$.

At a time point $t_0$ when the door is in the closed and locked state, the switches $S_1$ to $S_3$ are in ON, OFF and ON positions, respectively. When the key K is inserted in the cylinder lock 6 and is rotated at a time $t_1$, the switch $S_2$ is turned ON and the switch $S_1$ is turned OFF as a result of the unlocking of the door 3. This causes the power source circuit of the engine starting circuit to be closed. The power source circuit is remains closed until the opened door with its operating plate 11 being in the lower position is closed. The switch $S_2$ is turned OFF when the key K is released.

When the door 3 is opened at time $t_2$, the switch $S_3$ is turned OFF. The driver gets in the car and closes the door 3 at time $t_3$. This causes the switch $S_3$ to be turned ON. The operating plate 11 is pushed down for locking at time $t_4$, so that the switch $S_1$ is turned ON.

In getting out off the car, the operating plate 11 is pulled upward at time $t_5$, thereby turning the switch $S_1$ OFF. The door is opened at time $t_6$, rendering the switch $S_3$ OFF. Then the operating plate 11 is lowered to the lower position at time point $t_7$ to turn the switch $S_1$ ON. When the door is closed, the switch $S_3$ is turned ON with the power source circuit for the engine starting circuit being opened.

In the period of time between $t_1$ to $t_2$, $t_3$ to $t_4$ and $t_5$ to $t_6$, the door is closed an unlocked. By electrically connecting an alarm to the switches $S_1$ and $S_3$, such a state can be signalized. Such an alarm will be also actuated when someone pushes up the operating plate 11 using a wire or the like rather than the key.

Figure 9:
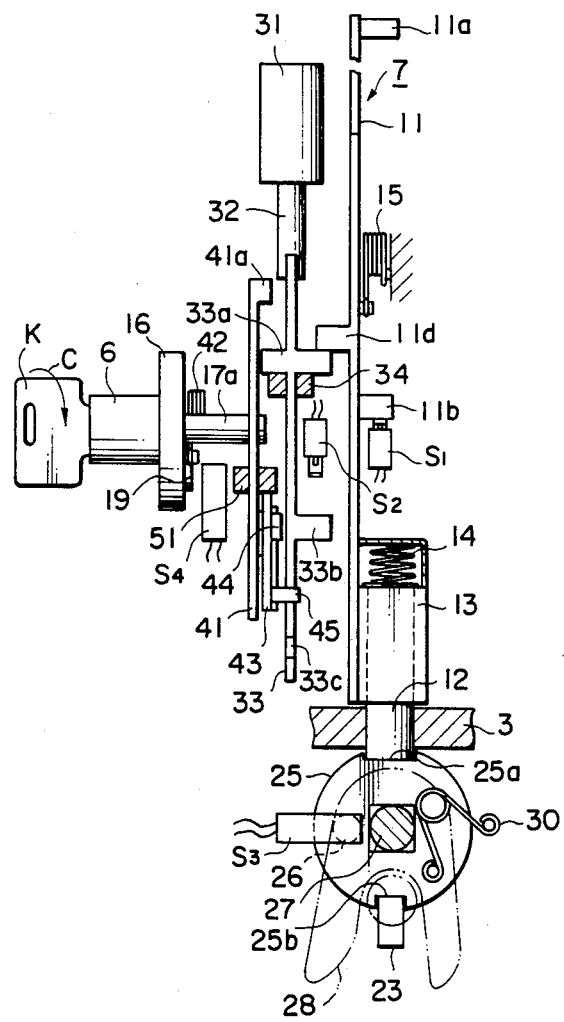
FIG. 9 is an elevational view, similar to FIG. 3, diagrammatically showing another embodiment of the present invention.
Figure 10:
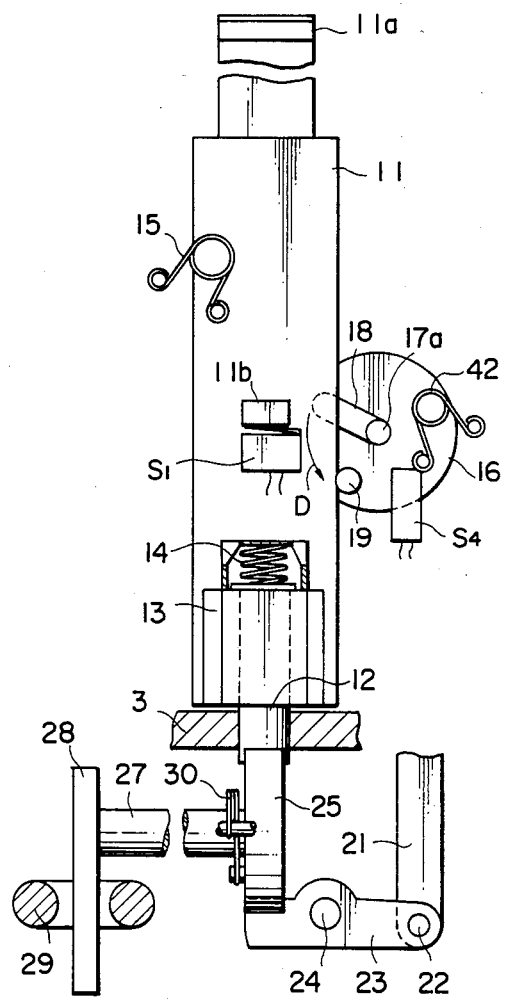
FIG. 10 is a side view of FIG. 9.

An alternate embodiment according to the present invention is illustrated in FIGS. 9 and 10 in which the same reference numerals designate similar component parts. The door lock device in this variant, likewise in the device shown hereinabove with reference to FIGS. 4–7, includes an operating plate 11, an engaging bar 12, a rotating member 25 having a groove 25a engageable with the engaging bar 12, a rocking lever 23 engageable with a second groove 25b of the rotating member 25, a U-shaped engaging plate 28 operatively connected with the rotating member 25 and cooperable with a hook member 29 for rotation of the rotating member 25. The construction and function of these elements are the same as those in the foregoing embodiment and the explanation thereof is not repeated here.

The door lock device in this embodiment includes a solenoid 31 having a plunger 32 and operating plate member 33 fixed to the plunger 32 for vertical movement therewith. The solenoid 31 in this embodiment is actuated by remote control. For example, by turning to an ON position a switch provided in a pocket portable controller (not shown) carried by the driver, laser signals or electrical signals with a predetermined pulse code are generated. The controller in this embodiment is preferably a laser key. The laser signals are read out by a control unit (not shown) provided in the car and if the read out signals are the same as memories stored therein, a command is supplied to the solenoid for the actuation thereof. Designated as 34 is a stopper to prevent the plunger 32 from falling from the solenoid 31 during its non-energized state.

The operating plate 11 in this variant is provided with a protruded portion 11d which serves to function similar a the indented portion 11c of the foregoing embodiment. Thus operating plate member 33 operatively connected to the solenoid 31 is provided with a projection 33a arranged for engagement with the protruded portion 11d of the operating plate 11 such that when the solenoid is actuated to raise the member 33 from a lower location (as shown in FIG. 9) to an upper location, the projection 33a is engaged by the protruded portion 11d to displace the operating plate 11 from a lower position (as shown in FIG. 9) to an upper position, but when the operating plate 11 is displaced from the lower position to upper position the protruded portion 11d is disengaged from the projection 33a.

The operating plate member 33 has an additional projection 33b adapted to engage with a switch $S_2$ fixed within the door 3. Thus, the switch $S_2$ is turned ON when the plate member 33 is moved to the upper location. The switch $S_2$ functions in the same manner as in the above first embodiment, i.e., the power source circuit for the engine starting circuit is actuated only when the switch $S_2$ is turned ON. As a result of the above construction, a mere movement of the operating plate 11 to the upper position is insufficient to start the engine though the door 3 is turned openable by such a movement.

Figure 11:
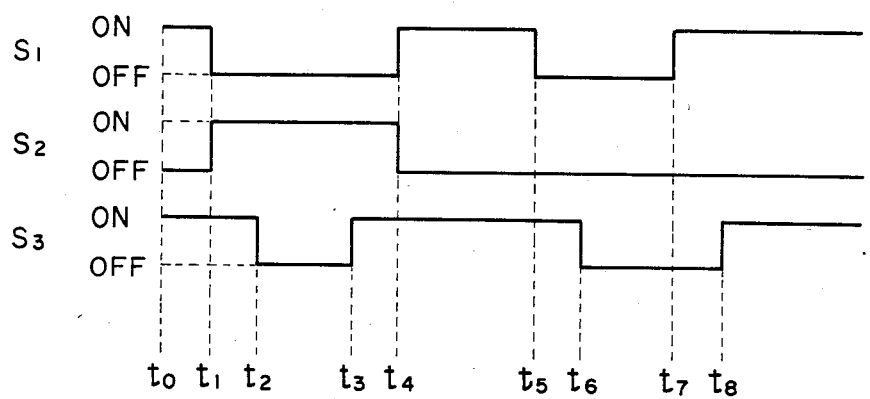
FIG. 11 is a wave form, similar to FIG. 8, showing the state of switches.

The operation of the door lock device shown in FIGS. 9 and 10 will be described below, reference being also made to FIG. 11 which is a wave form similar to FIG. 8.

At a time $t_0$ when the door is in the closed and locked state, the switches $S_1$ to $S_3$ are in ON, OFF and ON positions, respectively. When the laser key is actuated at a time $t_1$, laser signals with a predetermined pulse code are generated therefrom. If the laser signals generated from the laser key and received by the control unit in the car have the same pulse code as that stored or registered in the control unit, the solenoid 31 is actuated to move the operating plate member 33 to the upper location, thereby displacing the operating plate 11 to the upper position. Thus, the switch $S_2$ is turned ON and the switch $S_1$ is turned OFF. This causes the door to be openable and the power source circuit of the engine starting circuit to be closed. The power source circuit remains closed until the opened door with its operating plate 11 being in the lower position is closed.

When the door 3 is opened at time $t_2$, the switch $S_3$ is turned OFF. The driver gets in the car and closes the door 3 at time $t_3$. This causes the switch $S_3$ to be turned ON. The operating plate 11 is pushed down for locking at time $t_4$, so that the switch $S_1$ is turned ON. This also turns the switch $S_2$ to the OFF position.

When the driver gets out of the car, the operating plate 11 is pulled upward at time $t_5$, thereby turning the switch $S_1$ OFF. The door is opened at time $t_6$, rendering the switch $S_3$ OFF. Then the operating plate 11 is lowered to the lower position at time $t_7$ to turn the switch $S_1$ ON. When the door is closed, the switch $S_3$ is turned ON with the power source circuit for the engine starting circuit being opened.

In the period of time between $t_1$ to $t_2$, $t_3$ to $t_4$ and $t_5$ to $t_6$, the door is closed and unlocked. By electrically connecting an alarm to the switches $S_1$ and $S_3$, such a state can be signalized. Such an alarm will be also actuated when someone pushes up the operating plate 11 using a wire or the like rather than the key.

The lock device shown in FIGS. 9 and 10 is arranged so that the door may also be unlocked with a key K when the solenoid 31 is not actuated due to, for example, an electric failure in the laser key or control unit.

Thus, a cylinder lock 6 is provided in the door similar to the embodiment shown in FIG. 3. A rotating plate 16 is connected to the cylinder lock 6 so that the rotating plate 16 may be rotated with the key K. The rotating plate 16 has a center shaft 17a about which the plate 16 is rotated and to which a lever 18 is fixedly secured, so that the lever 18 may be rotated by turning the key K inserted into the key hole of the cylinder lock 6. A second operating plate 41 is provided adjacent to the operating plate member 33. The second operating portion 41b with which the lever 18 is continually engaged so that the rotation of the lever 18 always causes the second operating plate 41 to move downward or upward depending on the direction of the rotation of the lever 18. The second operating plate 41 is maintained in either an upper or lower position by means of a coil spring 42 mounted on the rotating plate 16. Designated as 41a is a stopper.

The second operating plate 41 is fixedly provided with a shaft 44 to which a rotor plate 43 is rotatably supported and with a protrusion 47 which is inserted through a guide slot 48 provided in the rotor plate 43. Thus, the rotor plate 43 is in moved up and down together with the second operating plate 41. The rotor plate 43 is rotated by the action of a spring 46 mounted on the protrusion 47. One leg of the spring 46 is in pressure engagement with a projection 50 of the rotor plate 43 with the other leg being biased against a projection 49 of the second operating plate 41, so that the rotor plate 43 is normally urged to rotate in the direction shown by the arrow E in FIG. 12. A stopper 51 is disposed in the door 3 at a position so that the rotor plate 43 is engaged by and is in pressure contact with the stopper 51 when the second operating plate is in the upper position. The rotor plate 43 has a projection 45 engageable with an indented portion 33c of the operating plate member 33.

The reference numeral 19 designates a magnet which actuates a switch $S_4$ when it is positioned adjacent thereto, i.e. when the rotating plate 16 is rotated to such a location as to render the second operating plate 41 in the lower position.

Figure 15:
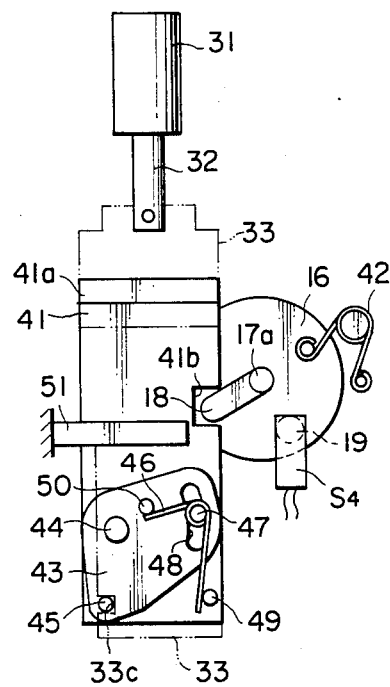
FIGS. 15 and 16 are views similar to FIG. 12 showing the operation of the locking device.

The above structure operates as follows. Referring to FIGS. 9 and 12 which show the state in which the door is closed and locked, when the key K is rotated in the direction shown by the arrow C, the lever 18 is rotated in the direction shown by the arrow D. As a result, the second operating plate 41 is displaced, together with the rotor plate 43, to the lower position. This causes the disengagement between the stopper 51 and the rotor plate 43 so that the rotor plate 43 is rotated in the direction shown by the arrow E by the action of the spring 46. Thus, as shown in FIG. 15, the projection 45 of the rotor plate 43 is engaged with the indented portion 33c of the operating plate member 33. The switch $S_4$ is turned ON.

Figure 14:
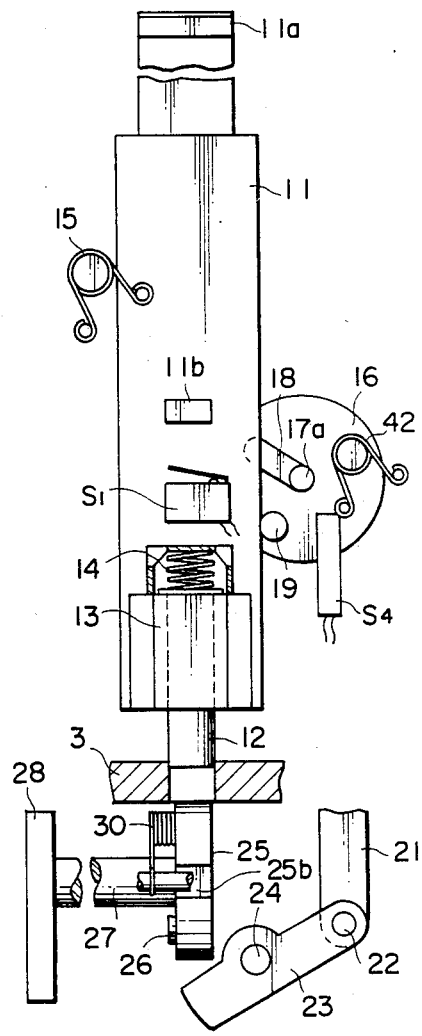
Figure 16:
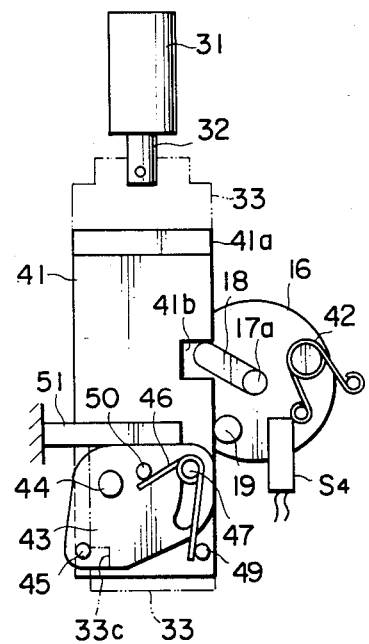

Then, the key K is manually rotated in the direction reverse to the arrow C. Thus, the lever 18 is rotated in the direction opposite to the arrow D in FIG. 12, causing the displacement of the second operating plate 41 from the lower position (as shown in FIG. 15) to the upper position as shown in FIGS. 13 and 14. Due to the engagement between the projection 45 and the indented portion 33c, the engaging plate member 33 is also displaced to the upper position. Furthermore, the operating plate 11 is moved to the upper position due to the engagement between the projection 33a and the protrusion 11d. This state is as shown in FIGS. 13 and 14. The switch $S_4$ is turned OFF and the door is unlocked and becomes openable. In this case, as the key K is rotated, the rotor plate 43 is brought into engagement with the stopper 51 and further upward movement of the second operating plate 41 causes the projection 45 to be disengaged from the indented portion 33c as shown in FIG. 16.

Figure 17:
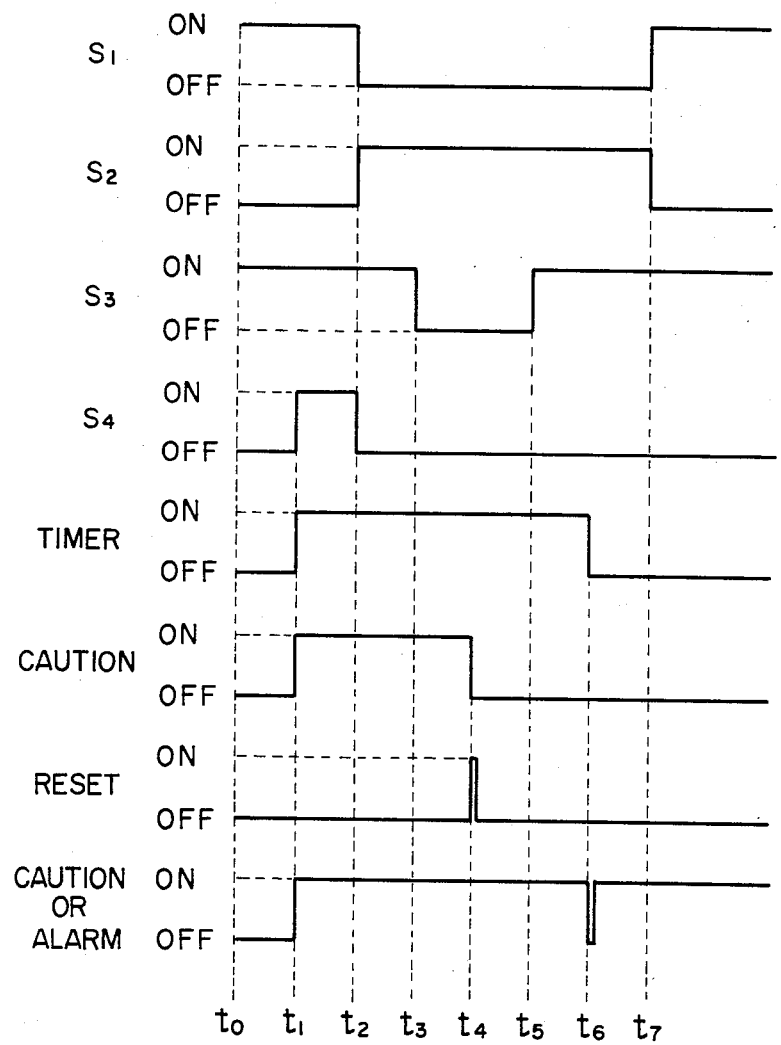
FIGS. 17 through 19 views similar to FIG. 11 showing the operations of switches, timer and alarm.
Figure 18:
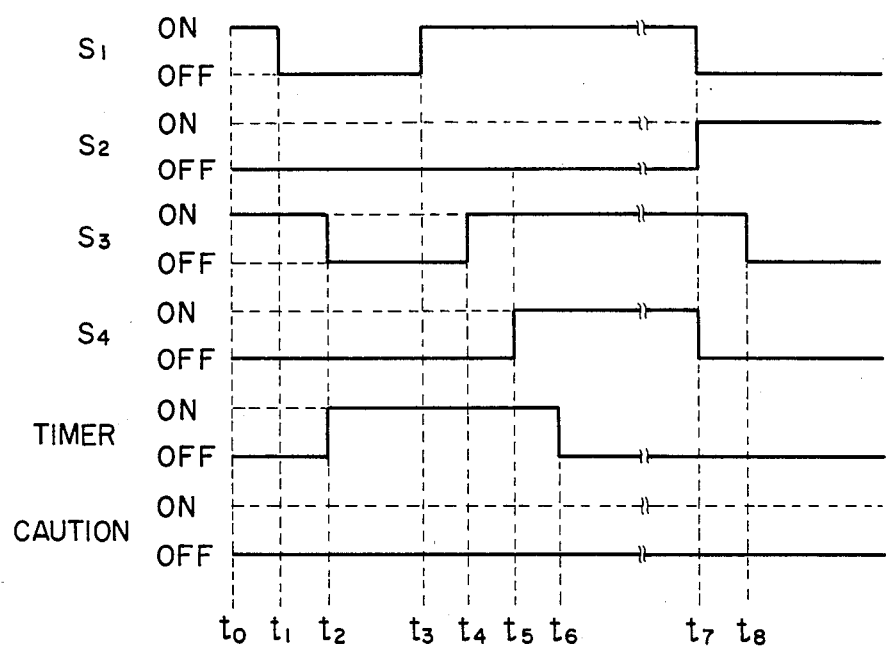
Figure 19:
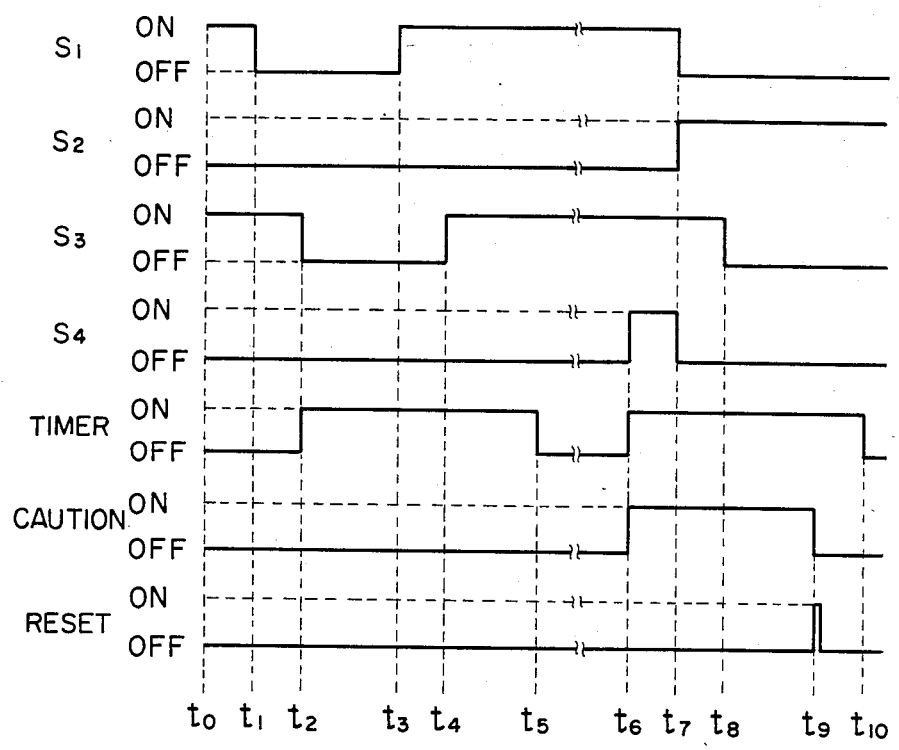

By connecting a timer to the switches and by providing a reset button and a cautionary/alarm sound generator to the timer, it is possible to produce a cautionary or alarm sound when the door is unlocked by manually turning the key K rather than by automatic actuation of the solenoid. One such an embodiment is shown in FIGS. 17 through 19 wherein the timer is arranged to be actuated either when the switch $S_4$ is turned ON in the conditions in which the switches $S_1$ and $S_3$ are both in the ON positions or when the switch $S_3$ is turned OFF in the conditions in which the switch $S_1$ is in the OFF position and wherein the alarm is actuated only when the timer is actuated and the switch $S_4$ is in the ON position. Such an arrangement may be easily prepared by using suitable conventional circuits.

At time $t_0$, the door is in the closed and locked state. When the key inserted into the cylinder lock 6 is rotated in the direction C (FIG. 9) at time $t_1$, the switch $S_4$ is turned ON to start the actuation of the timer for a predetermined period, e.g. 20 sec. The caution generator is actuated upon the actuation of the timer and continues to generate a cautionary sound for the predetermined period or until the reset button is pushed ($t_4$). If the reset button is not to pushed, the cautionary sound is stopped after the lapse of the predetermined period ($t_4$) but, instead, an alarm sound is generated ($t_6$). In FIG. 17, at $t_2$ the key K is turned to the reverse direction as shown in FIG. 16, at $t_3$ the door is opened, at $t_5$ the door is closed and at $t_7$ the operating plate is displaced to the lower position to lock the door.

The above arrangement permits a driver to prevent the cautionary/alarm sound from generating if the driver so wishes. Such an operation is shown in FIG. 18. At time $t_0$, the driver is in the car with the door being closed and locked. The manual lock (operating plate 11) is moved upward at time $t_1$ to turn the switch $S_1$ OFF. When the door 3 is opened at time $t_2$, the timer is actuated for the predetermined period of time. After getting off the car, the operating plate 11 is moved to the lower position at time $t_3$ to turn the switch $S_1$ ON. The door 3 is closed at time $t_4$ with the simultaneous locking thereof. If the key K is inserted in the cylinder lock 6 and is rotated in the direction shown by the arrow C in FIG. 9 to turn the switch $S_4$ ON at time $t_5$ before the lapse of the predetermined period, the caution generator is maintained in the non-actuated state henceforth. Thus, when the door is unlocked by turning the key K at time $t_7$ and is opened at time $t_8$, no cautionary sound is generated.

If the switch $S_4$ is not turned ON before the termination of the operation of the timer, the cautionary sound will be generated when the switch $S_4$ is later turned ON, as shown in FIG. 19. In FIG. 19, the times $t_0$ through $t_4$ correspond to those in FIG. 18, respectively; the operation of the timer is terminated at time $t_5$; $t_6$ through $t_9$ correspond to $t_1$ through $t_4$ in FIG. 17, respectively; and $t_{10}$ corresponds to $t_6$ in FIG. 17.

I claim:

1. A lock device for an automobile door, said automobile having an engine starting circuit, a door frame and a door pivotally supported on the door frame, said device comprising:
    an operating plate supported on the door and moveable between upper and lower positions;
    engaging means engageable with said operating plate and moveable between first and second positions such that when said engaging means is displaced from the first to the second position the operating plate is moved from the lower to the upper position, but when the operating plate is moved from the lower to the upper position the engaging means in the first position is disengaged therefrom and is not moved;
    actuating means for moving said engaging means from the first to the second position;
    a hook member provided in the door frame;
    latch means provided in the door and capable of engaging with said hook member when the door is closed and disengaged from said hook member when the door is opened;
    an engaging portion provided in said operating plate and engageable with said latch means to prevent said latch means from disengaging from said hook member when said operating plate is in the lower position and disengageable from said latch means to permit said latch means to disengage from said hook member when said operating plate is in the upper position; and
    means capable of detecting the position of said engaging means and electrically coupled to said engine starting circuit to make said engine starting circuit operable only upon detection of the movement of said engaging means from said first to said second position.

2. A door lock device as claimed in claim 1, wherein said actuating means comprises a combination of a key and a cylinder lock having a key hole fitted for the key and said engaging means comprises a lever operatively connected to said cylinder lock and rotatable by turning said key inserted in said, key hole, so that said lever is moved from the first to the second position by rotation of the key.

3. A door lock device as claimed in claim 1, wherein said engaging means comprises a second operating plate moveable between the first and second positions and wherein said actuating means comprises means for generating predetermined signals, a control unit provided in the car and capable of receiving said predetermined signals and of generating a command signal when said predetermined signals received are the same as those stored in the control unit, and drive means, responsive to the command signal, for moving said second operating plate from the to first to second position.

4. A door lock device as claimed in claim 3, further comprising a cylinder lock having a key hole, a lever operatively connected to said cylinder lock and rotatable in both directions by turning said key inserted in said key hole, an operating plate member engaged with said lever and moveable between upper and lower locations by rotation of said key inserted into said key hole, an engaging member mounted on said operating plate member for movement therewith and engageable with said second operating plate located in the first position when said operating plate member is in the lower location, so that the displacement of said operating plate member from the lower to upper location causes the displacement of said second operating plate from the first to the second position, said engaging member engaged with said second operating plate being disengaged therefrom when said operating plate member is displaced to the upper location.

* * * * *